(12) United States Patent
Jerdee et al.

(10) Patent No.: US 11,278,924 B2
(45) Date of Patent: Mar. 22, 2022

(54) PLURAL COMPONENT SPRAY GUN SYSTEM

(71) Applicant: Wagner Spray Tech Corporation, Plymouth, MN (US)

(72) Inventors: Jeffrey S. Jerdee, Brooklyn Park, MN (US); Thomas P. Daigle, Hanover, MN (US); Shawn C. Johnson, Milaca, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 104 days.

(21) Appl. No.: 16/157,694

(22) Filed: Oct. 11, 2018

(65) Prior Publication Data

US 2019/0151871 A1 May 23, 2019

Related U.S. Application Data

(60) Provisional application No. 62/589,141, filed on Nov. 21, 2017, provisional application No. 62/589,145, filed on Nov. 21, 2017.

(51) Int. Cl.
*B05B 7/12* (2006.01)
*B29B 7/76* (2006.01)
(Continued)

(52) U.S. Cl.
CPC .......... *B05B 7/1209* (2013.01); *B01F 5/0608* (2013.01); *B01F 15/00032* (2013.01);
(Continued)

(58) Field of Classification Search
CPC ... B05B 1/3026; B05B 7/0043; B05B 7/0408; B05B 7/0416; B05B 12/0026;
(Continued)

(56) References Cited

U.S. PATENT DOCUMENTS

| 3,437,273 A | 4/1969 | Hagfors |
| 4,117,551 A * | 9/1978 | Brooks ................. B05B 7/1209 |
| | | 366/162.1 |

(Continued)

FOREIGN PATENT DOCUMENTS

| CN | 1139415 A | 1/1997 |
| DE | 2743589 A1 | 3/1979 |

(Continued)

OTHER PUBLICATIONS

International Search Report and Written Opinion for International Patent Application No. PCT/US2018/056017 dated Feb. 8, 2018, date of filing: Oct. 16, 2018, 13 pages.

(Continued)

*Primary Examiner* — Cody J Lieuwen
(74) *Attorney, Agent, or Firm* — Christopher J. Volkmann; Kelly, Holt & Christenson, PLLC

(57) ABSTRACT

A spray gun for a plural component system is provided. The spray gun includes a first component delivery line and a second component delivery line. The spray gun also includes a nozzle, configured to receive and mix a first component received from the first component delivery line with a second component received from the second component delivery line. The spray gun also includes an air purge system configured to, when the spray gun is in a non-actuated position, purge the nozzle of the first and second components and, when the spray gun is in an actuated position, aid in atomization of the mixture of the first and second components.

14 Claims, 16 Drawing Sheets

(51) Int. Cl.
    *B29B 7/74*     (2006.01)
    *B29B 7/80*     (2006.01)
    *B05B 7/04*     (2006.01)
    *B05B 15/55*    (2018.01)
    *B05B 7/24*     (2006.01)
    *B05B 7/00*     (2006.01)
    *B05B 1/30*     (2006.01)
    *B01F 5/06*     (2006.01)
    *B01F 15/00*    (2006.01)
    *B05B 12/00*    (2018.01)

(52) U.S. Cl.
    CPC .......... B05B 1/3026 (2013.01); B05B 7/0043 (2013.01); B05B 7/0408 (2013.01); B05B 7/0416 (2013.01); B05B 7/2497 (2013.01); B05B 15/55 (2018.02); B29B 7/7409 (2013.01); B29B 7/7419 (2013.01); B29B 7/7428 (2013.01); B29B 7/761 (2013.01); B29B 7/805 (2013.01); B29B 7/808 (2013.01); *B01F 2215/0039* (2013.01); *B05B 12/0026* (2018.08)

(58) Field of Classification Search
    CPC ......... B05B 15/52; B05B 15/55; B05B 15/63; B29B 7/7409; B29B 7/7419; B29B 7/7428; B29B 7/761; B29B 7/805; B29B 7/808; B01F 2215/00032; B01F 2215/0039; B01F 5/0608
    USPC ........... 239/112, 414, 416.1, 428, 432, 581.1
    See application file for complete search history.

(56) References Cited

U.S. PATENT DOCUMENTS

| | | | |
|---|---|---|---|
| 4,263,166 A | 4/1981 | Adams | |
| 5,462,204 A | 10/1995 | Finn | |
| 5,529,245 A * | 6/1996 | Brown | B05B 7/1209 |
| | | | 239/390 |
| 6,062,492 A * | 5/2000 | Tudor | B01F 5/0614 |
| | | | 239/296 |
| 6,158,624 A * | 12/2000 | Grigg | B01F 13/0027 |
| | | | 222/145.6 |
| 2004/0124268 A1 | 7/2004 | Frazier et al. | |
| 2008/0144426 A1 | 6/2008 | Janssen et al. | |
| 2011/0011950 A1 | 1/2011 | Walter | |
| 2013/0015262 A1* | 1/2013 | Monchamp | B29B 7/7605 |
| | | | 239/61 |
| 2015/0367360 A1* | 12/2015 | Ingebrand | B29B 7/761 |
| | | | 366/138 |
| 2017/0281869 A1 | 10/2017 | Kai et al. | |
| 2018/0126396 A1* | 5/2018 | Ellis | B05B 7/0408 |
| 2018/0243767 A1* | 8/2018 | Stewart | B05B 15/55 |
| 2019/0022693 A1* | 1/2019 | Calaman | B05C 17/002 |
| 2019/0039086 A1* | 2/2019 | Kim | B05B 7/0408 |

FOREIGN PATENT DOCUMENTS

| | | |
|---|---|---|
| JP | 05-007356 U | 2/1993 |
| JP | 2006-511343 A | 4/2006 |
| SU | 1407839 A1 | 7/1988 |
| WO | WO 2017053105 A1 | 3/2017 |

OTHER PUBLICATIONS

International Search Report and Written Opinion for International Patent Application No. PCT/US2018/030130 dated Aug. 14, 2018, 17 pages.
Application and Drawings for U.S. Appl. No. 15/963,390, filed Apr. 26, 2018, 33 pages.
International Preliminary Report on Patentability for International Patent Application No. PCT/US2018/056017, dated Jun. 4, 2020, filing date of Oct. 16, 2018, 10 pages.
Extended Search Report for European Patent Application No. 18881510.4 dated Jul. 6, 2021, 9 pages.
Second Office Action for Chinese Patent Application No. 201880073595.X dated Aug. 16, 2021, 17 pages with English Translation.
First Office Action for Chinese Patent Application No. 201880073595.X dated Dec. 28, 2020, 13 pages with English Translation.

* cited by examiner

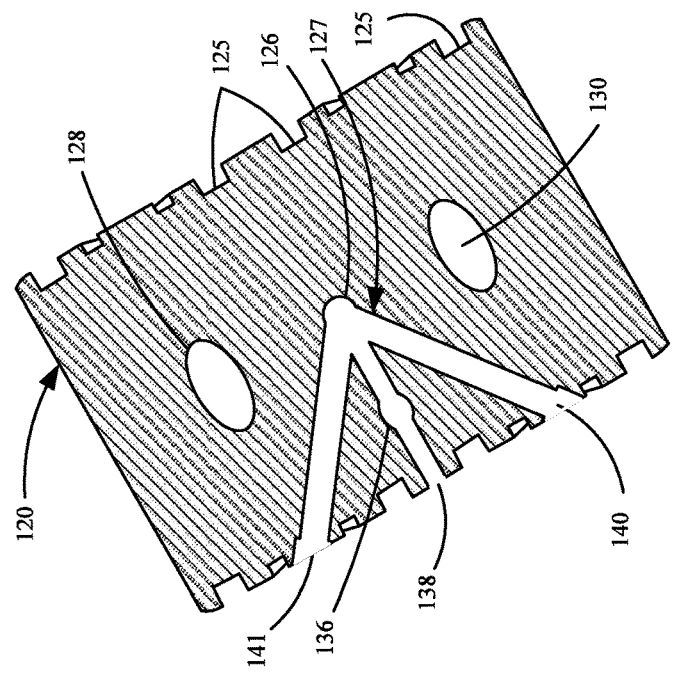
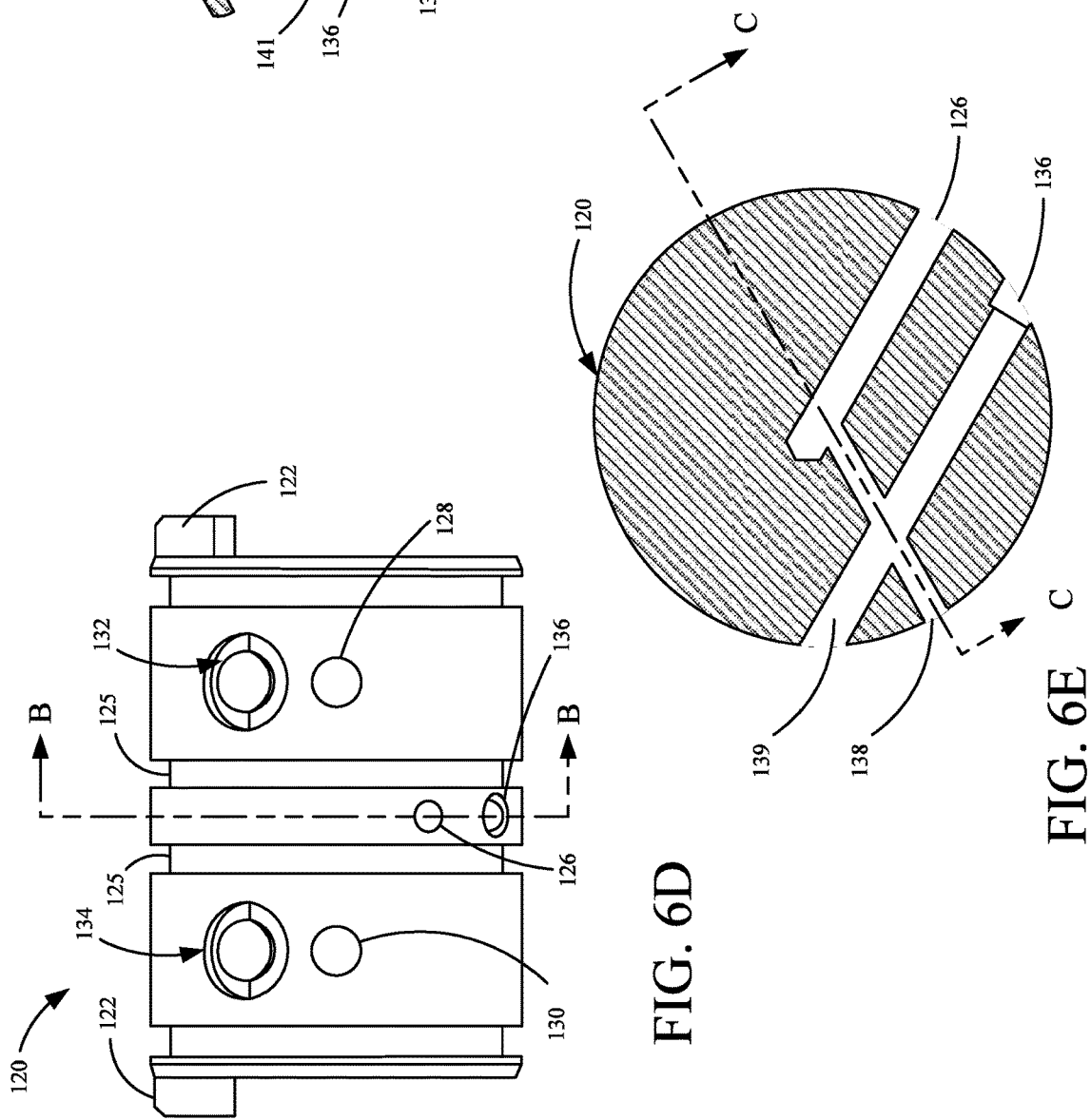
FIG. 6D
FIG. 6E
FIG. 6F

PLURAL COMPONENT SPRAY GUN SYSTEM

CROSS-REFERENCE TO RELATED APPLICATION

The present application is based on and claims the benefit of U.S. provisional patent application Ser. No. 62/589,141, filed Nov. 21, 2017, and U.S. provisional patent application Ser. No. 62/589,145, filed Nov. 21, 2017, the content of which are hereby incorporated by reference in their entirety.

BACKGROUND

Plural component systems provide a number of different liquid materials that are combined or mixed at a particular ratio to generate a composition that is delivered for coating a surface, for example. Some plural component applications include, but are not limited to, building construction and various applications within automotive, agricultural, marine, and industrial environments. More specifically, some particular applications include, but are not limited to, spraying foam insulation and spraying protective coatings on pipes and tanks, structural steel, and marine vessels, to name a few.

SUMMARY

A spray gun for a plural component system is provided. The spray gun includes a first component delivery line and a second component delivery line. The spray gun also includes a nozzle, configured to receive and mix a first component received from the first component delivery line with a second component received from the second component delivery line. The spray gun also includes an air purge system configured to, when the spray gun is in a non-actuated position, purge the nozzle of the first and second components and, when the spray gun is in an actuated position, aid in atomization of the mixture of the first and second components.

BRIEF DESCRIPTION OF THE FIGURES

FIG. 6D is a front elevation view of the example valve.

FIGS. 6E-F are sectional views of the example valve.

DETAILED DESCRIPTION OF THE DRAWINGS

Plural component systems are a mechanism for simultaneous mixing and atomization of two or more reactants or components, often used to create a foam product, for example insulation. Plural component spraying systems present a number of design challenges. For example, once mixed, some components should be quickly applied as the curing process begins immediately. Any backflow can clog an applicator and potentially make it unusable. Additionally, the components must undergo enough mixing prior to dispersal to have sufficient yields when atomized. Each of the components has its own delivery line to a mixing chamber within the applicator nozzle. However, for at least some components, being left within the mixing chamber or nozzle for a short period of time can cause the components to harden, causing the applicator to experience reduced performance between each trigger depression. For some components, it can take only a minute of down time between spray operations to cause component hardening within the mixing chamber or nozzle. This can cause operators of a plural component applicator to have to use multiple nozzles per spraying operation, changing a used nozzle for a fresh nozzle with each trigger pull.

A plural component applicator is desired, therefore, that experiences enough atomization to increase yields, and also keeps delivery lines free from reactant in between trigger pulls. This may allow for a nozzle to be used for an entire spraying operation, without significant performance degradation.

Figure 1A:
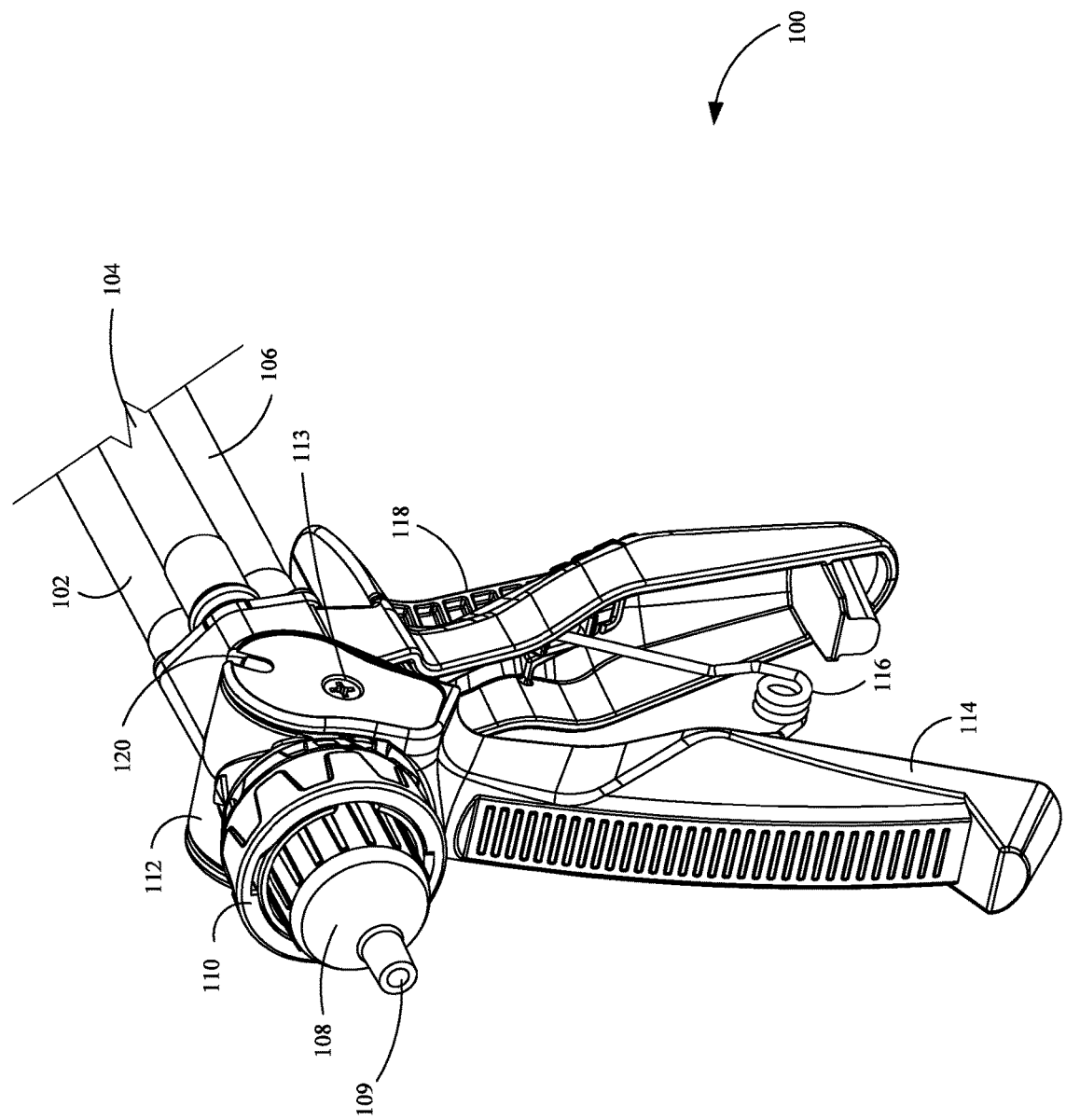
FIGS. 1A-B are perspective views showing an example plural component applicator.
Figure 1B:
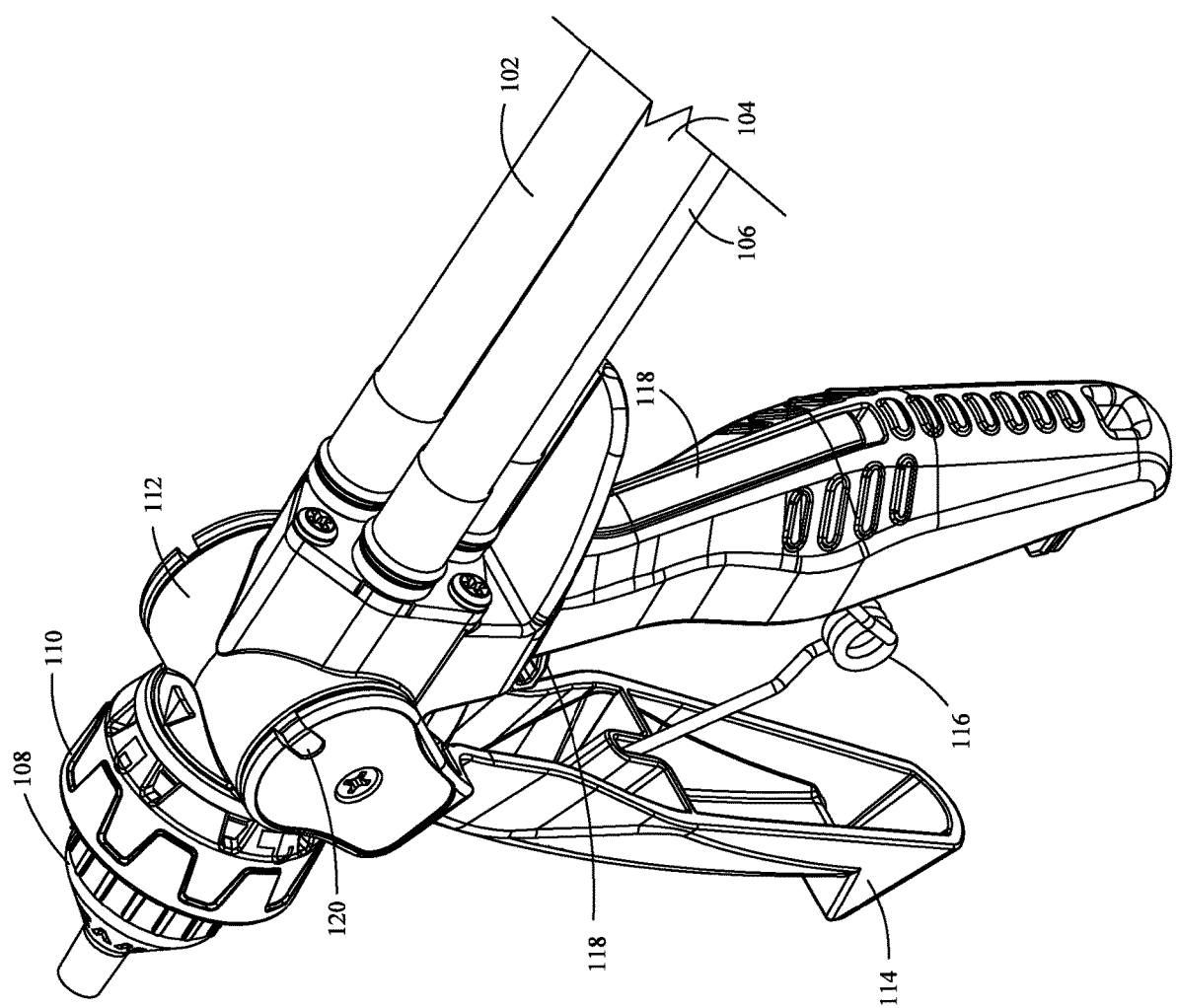

FIG. 1A is a front perspective view of plural component applicator 100. FIG. 1B is a rear perspective view of plural component applicator 100. Plural component applicator 100 receives components from component supply line 102 and component supply line 104. The components received from these supply lines are mixed in nozzle 108 and applied by plural component applicator 100 through outlet 109. To aid in various functions that will be described below, air is supplied to plural component applicator 100 through air supply line 106. As shown there are two components supply lines and one air supply line, however in other examples there may be greater or fewer numbers of these supply lines.

Component supply line 102, component supply line 104 and air supply line 106 are operably coupled to valve 120. Valve 120 has inputs and outputs that correspond to each component and air supply line. When actuated, valve 120 adjusts the flow of components and air through plural component applicator 100. Valve 120 is housed in rotating valve housing 112 and is coupled to valve housing 112 and trigger 114 by valve fastener 113. As shown, valve fastener 113 is a screw, however in other examples valve fastener 113 can be other types of fasteners as well.

Trigger 114, when actuated, rotates valve 120 within valve housing 112. For example, since trigger 114 is coupled to valve 120, when trigger 114 is actuated, valve 120 is rotated and hence actuated. Valve 120 rotates to adjust flow of components and air from component supply line 102, component supply line 104 and air supply line 106. For instance, when valve 120 is in an open position, components from component supply line 102 and component supply line 104 flow to nozzle 108 where they are mixed prior to being expelled out outlet 109.

Trigger spring 116 biases trigger 114 and valve 120 towards a closed position, (i.e., a closed position where components and/or air are not allowed out of nozzle 108). Trigger 114 can interact with trigger lock 118 to prevent actuation of trigger 114. For example, trigger 114 cannot be actuated unless trigger lock 118 is also actuated or actuated first. Trigger lock 118 can prevent accidental emissions of components through outlet 109. For example, if a user dropped plural component applicator 100 onto trigger 114, trigger lock 118 could prevent trigger actuation and component emission as it is unlikely the drop would cause actuation of trigger lock 118. Trigger lock 118 can also include a spring or other biasing member to bias trigger lock 118 into an unactuated position.

Nozzle 108 is where the components from component supply line 102 and component supply line 104 are mixed before being expelled through outlet 109. Nozzle 108 can be attached to plural component applicator 100 by nozzle lock 110. Nozzle lock 110, as shown, has a channel that receives pins of nozzle 108 and the rotation of nozzle lock 110 locks nozzle 108 onto plural component applicator 100, by capturing the pins of nozzle 108. In one example, forward rotation of nozzle lock 110 provides a locking force on nozzle 108 in a direction towards plural component applicator 100. For instance, this force seats and seals nozzle 108 to applicator 100. Similarly, reverse rotation of nozzle lock 110 could provide an ejection force on nozzle 108 in a direction away from plural component applicator 100. This conversion of rotational force to linear force could be accomplished by a sloped channel formed in nozzle lock 110. The ejection force may be especially useful if the components begin to harden which can create a bonding force between the nozzle 108 and applicator 100.

Figure 2A:
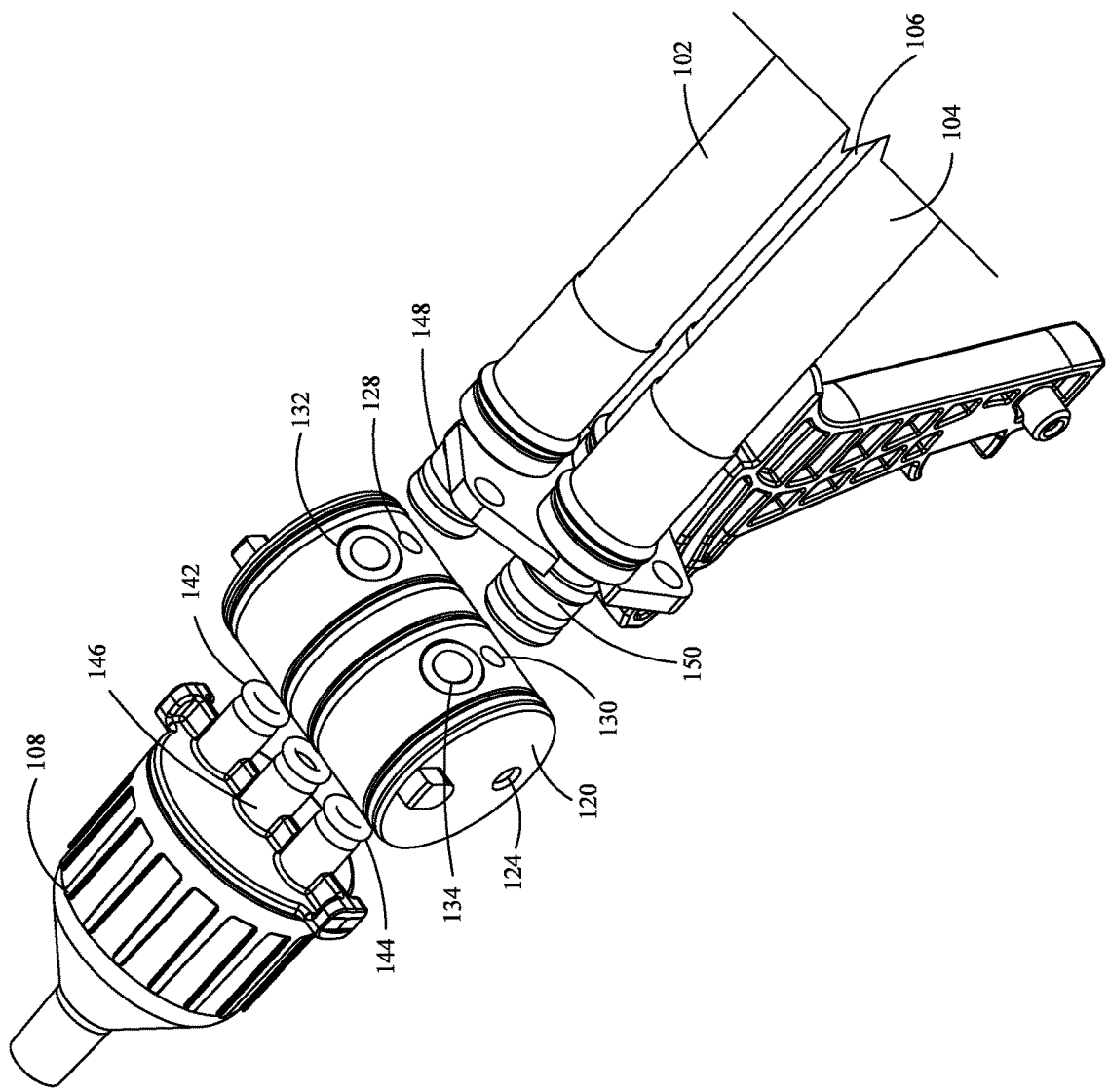
FIGS. 2A-B are perspective views showing an example partial plural component applicator.

FIG. 2A is a simplified view of plural component applicator 100 with several components omitted for clarity of the fluid path and valve 120 function. FIG. 2A shows valve 120 in an open position and FIG. 2B shows valve 120 in a closed position.

As shown in FIG. 2A, component valve inlet 128 aligns with component supply line 102 via component line outlet 148. Similarly, component valve inlet 130 aligns with component supply line 104 via component line output 150. When valve 120 is in this position, fluid flow from component supply line 102 and component supply line 104 enters valve 120 through component valve inlet 128 and component valve inlet 130, respectively. Component valve inlet 128 allows fluid flow to nozzle component inlet 142 and component valve inlet 130 allows fluid flow to nozzle component inlet 144. Fluid that enters nozzle component inlet 142 and nozzle component inlet 144 flow into nozzle 108 where they are mixed together before being expelled through outlet 109.

Figure 2B:
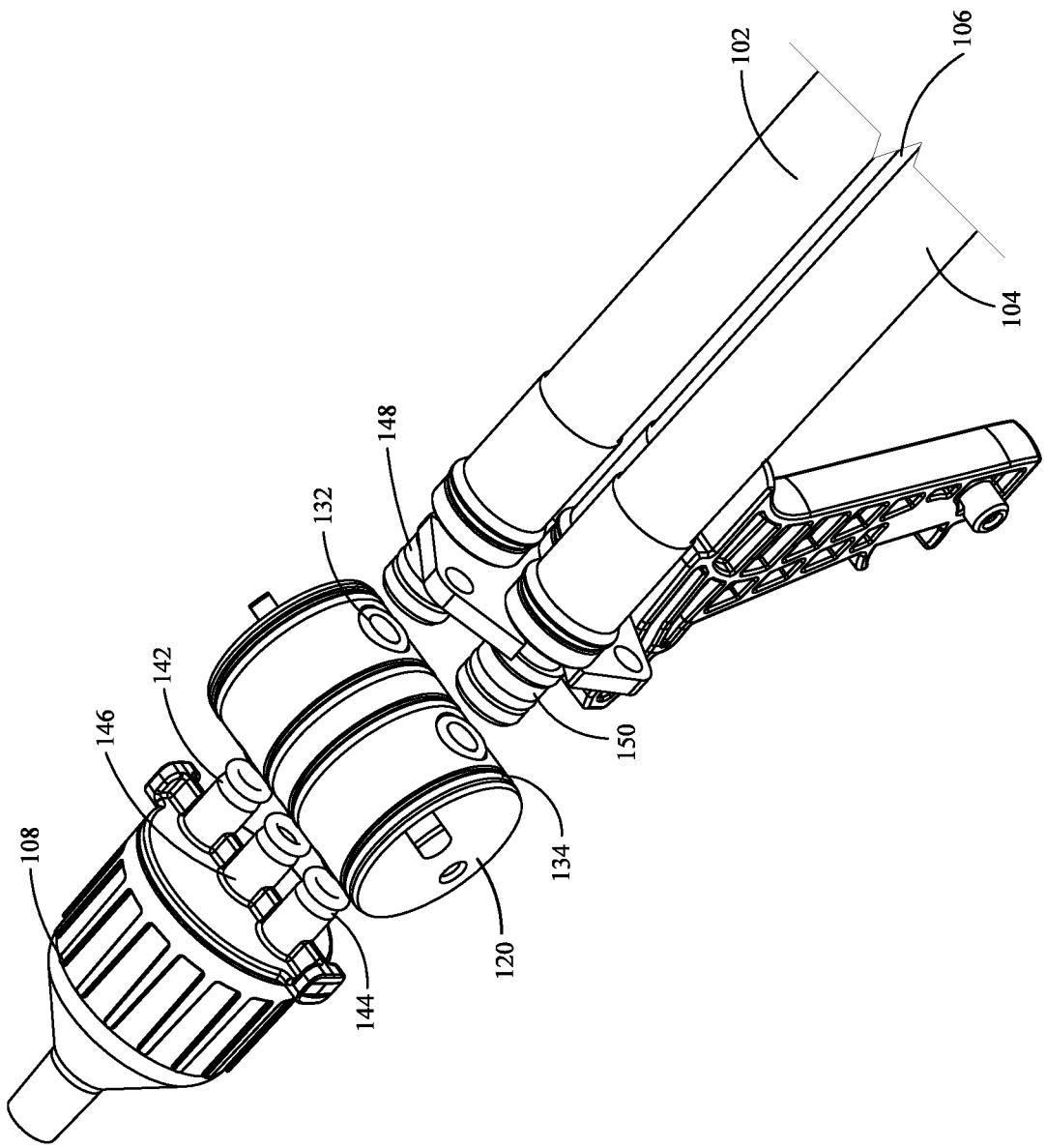

In FIG. 2B, valve 120 is in a closed position such that component plug 132 aligns with component supply line 102 via component line outlet 148. Similarly, component plug 134 aligns with component supply line 104 via component line outlet 150. Component plugs 132 and 134 block flow from component supply line 102 and component supply line 104, respectively. Component plug 132 and component plug 134 as shown include o-rings to more tightly seal the closed connection. Mechanisms similar to component plug 132 and component plug 134 are sometimes referred to as face seals.

FIGS. 2A and 2B also show air supply line 106. Regardless of whether valve 120 is in an open or closed position, air from air supply line 106 is directed to nozzle air inlet 146. However, when valve 120 is in a closed position, air from air supply line 106 can be directed to nozzle component inlet 142 and nozzle component inlet 144 in addition to nozzle air inlet 146. This delivery of airflow can automatically purge component nozzle inlet 142, nozzle component inlet 144, nozzle air inlet 146, nozzle 108 and outlet 109. Purging the system may prevent mixed components from hardening or being retained in any of these, or proximate, components. In previous systems a user would manually turn a valve to induce a purging air flow.

In previous designs, nozzle 108, specifically component nozzle inlet 142 and nozzle component inlet 144, were susceptible to retaining some portion of first and second components after trigger 114 is returned to a non-spraying position. First and second components retained in nozzle 108 can reduce a spraying efficacy of plural component applicator 100 during a next trigger actuation. For this reason, many operators of plural component applicators not only use disposable nozzles but have to replace the nozzle multiple times during a spray operation, for example each time an operator ceases spraying and the nozzle rests. Some components can form layers within a nozzle in less than a minute of downtime. Therefore, if an operator had to take a break from spraying for more than a minute (for example to relocate, etc.), a new nozzle may have been required before spraying could resume.

Additionally, removing and replacing the nozzle can cause reactants to build up within the spray gun nozzle attachment portion as well, making it more difficult, over time, to attach a new nozzle over the hardened layers of reactant.

By automatically purging air through nozzle 108 and like components after trigger release, a majority of the above-mentioned problems can be solved.

Figure 3A:
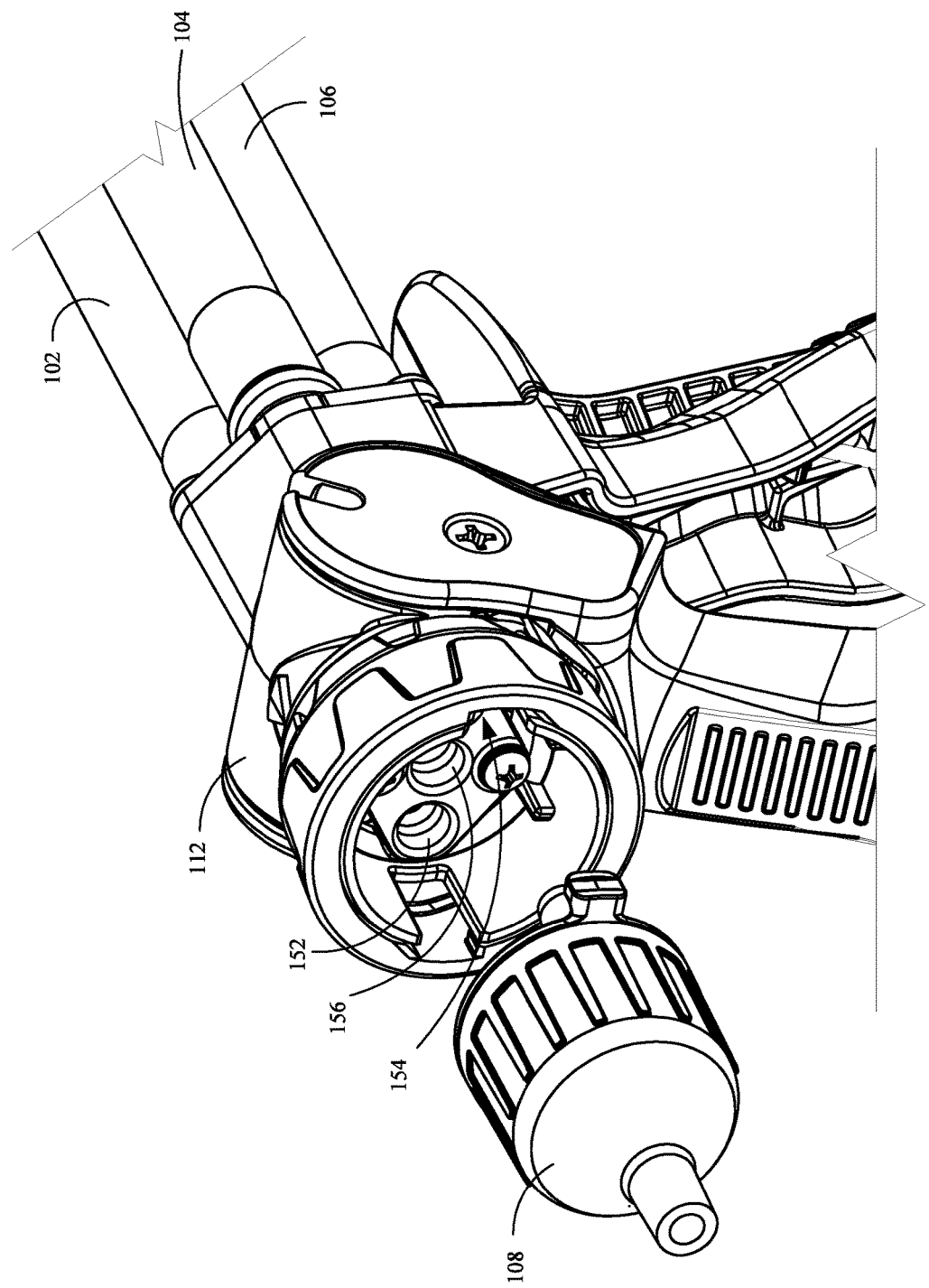
FIGS. 3A-B are perspective views showing an example sequence of coupling a nozzle to a plural component applicator.
Figure 3B:
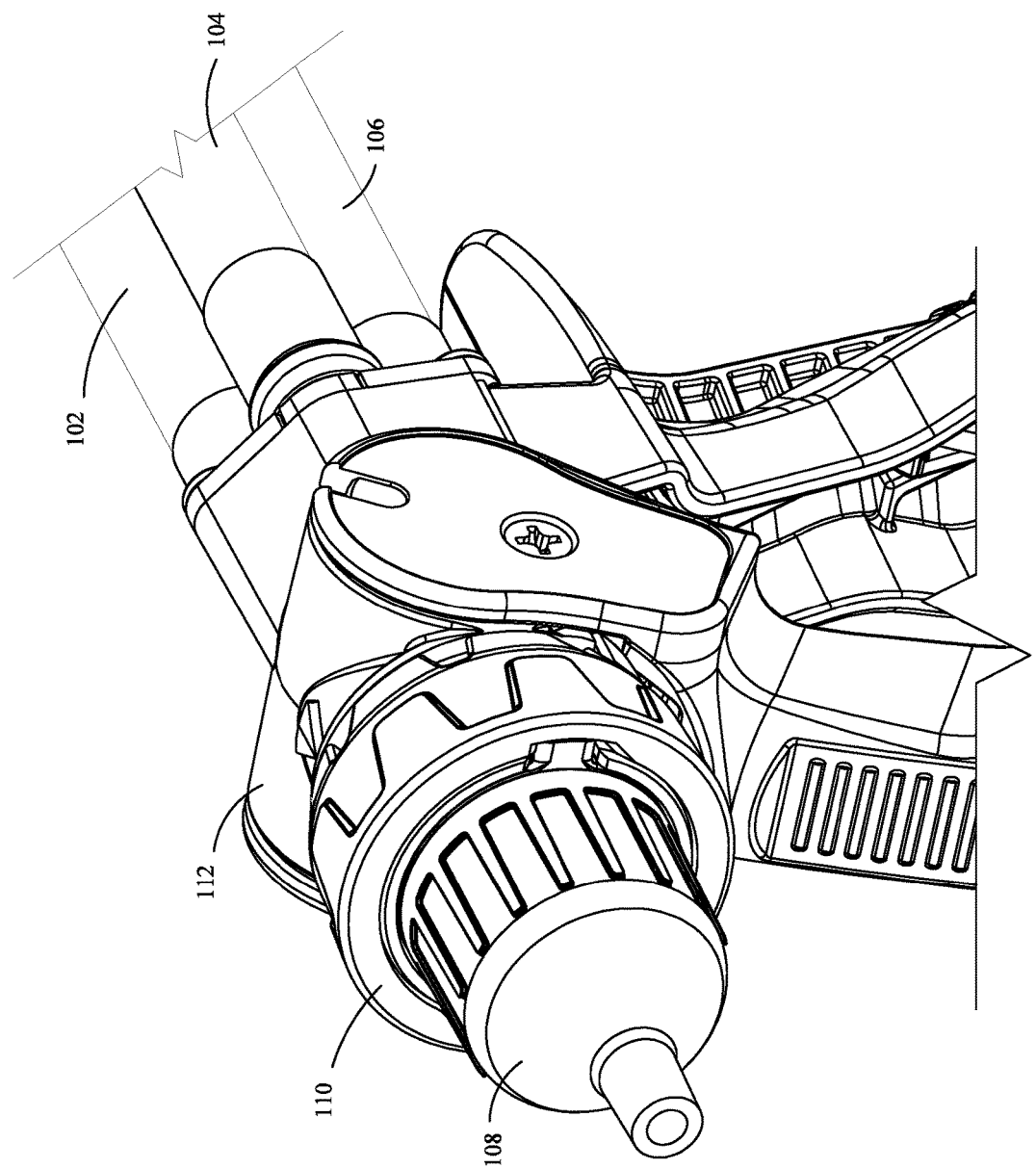

FIG. 3A is a perspective view showing an example of a plural component applicator with nozzle 108 detached from the applicator. FIG. 3B is a perspective view showing an example of a plural component applicator with an attached nozzle. In FIG. 3A, nozzle 108 is detached from plural component applicator 100. Nozzle 108 is aligned with plural component applicator 100 such that nozzle 108 will couple to component nozzle interface 152, component nozzle interface 154 and air nozzle interface 156. Nozzle 108 includes nozzle pins 111 that align with channels 115 of plural component applicator 100. The alignment of nozzle pins 111 with channel 115 ensures proper alignment of the nozzle to component nozzle interface 152, component nozzle interface 154 and air nozzle interface 156. In some examples, nozzle 108 can be aligned in two different ways without affecting the applicator operation. For instance, nozzle 108 as shown may be rotated 180 degrees, inserted, and still function.

In FIG. 3B nozzle 108 is inserted into plural component applicator 100 such that nozzle pins 111 are located within channel 115 once inserted, nozzle 108 can then be locked into place. In one example, nozzle lock 110 is rotated to lock nozzle 108 in place. Nozzle lock 110 includes a sloped channel such that rotation of nozzle lock 110 linearly forces nozzle 108 into contact with component nozzle interface 152, component nozzle interface 154 and air nozzle interface 156. Similarly, the sloped channel of nozzle lock 110 can apply a force on nozzle 108 away from component nozzle interface 152, component nozzle interface 154 and air nozzle interface 156 when nozzle lock 110 is rotated in the opposite direction. This can be useful when the components being fed through plural component applicator 110 harden quickly and nozzle 108 may be partially bonded onto the applicator.

Figure 4A:
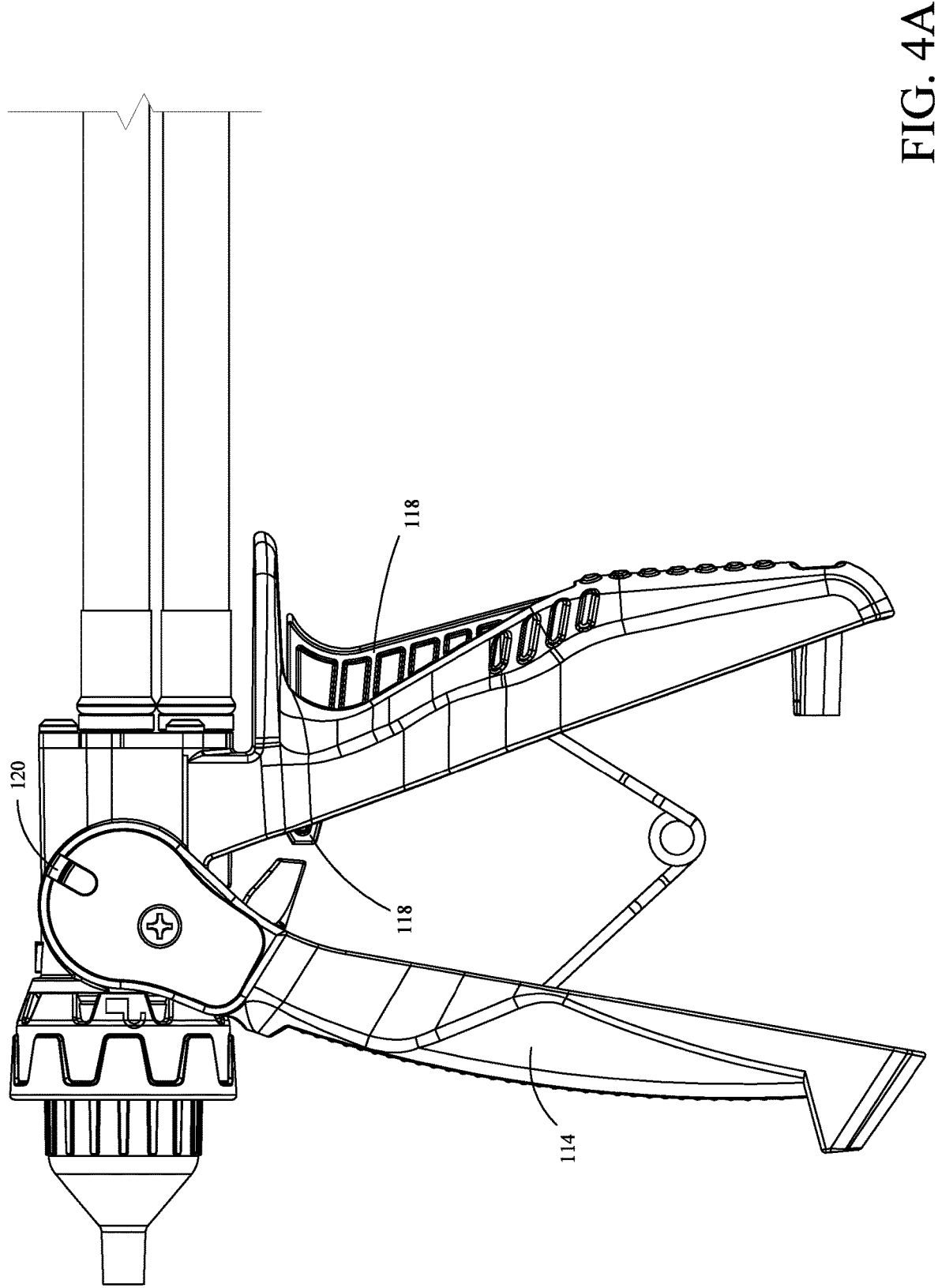
FIGS. 4A-4C are side elevation views showing an example sequence of actuating a trigger and trigger lock of a plural component applicator.
Figure 4B:
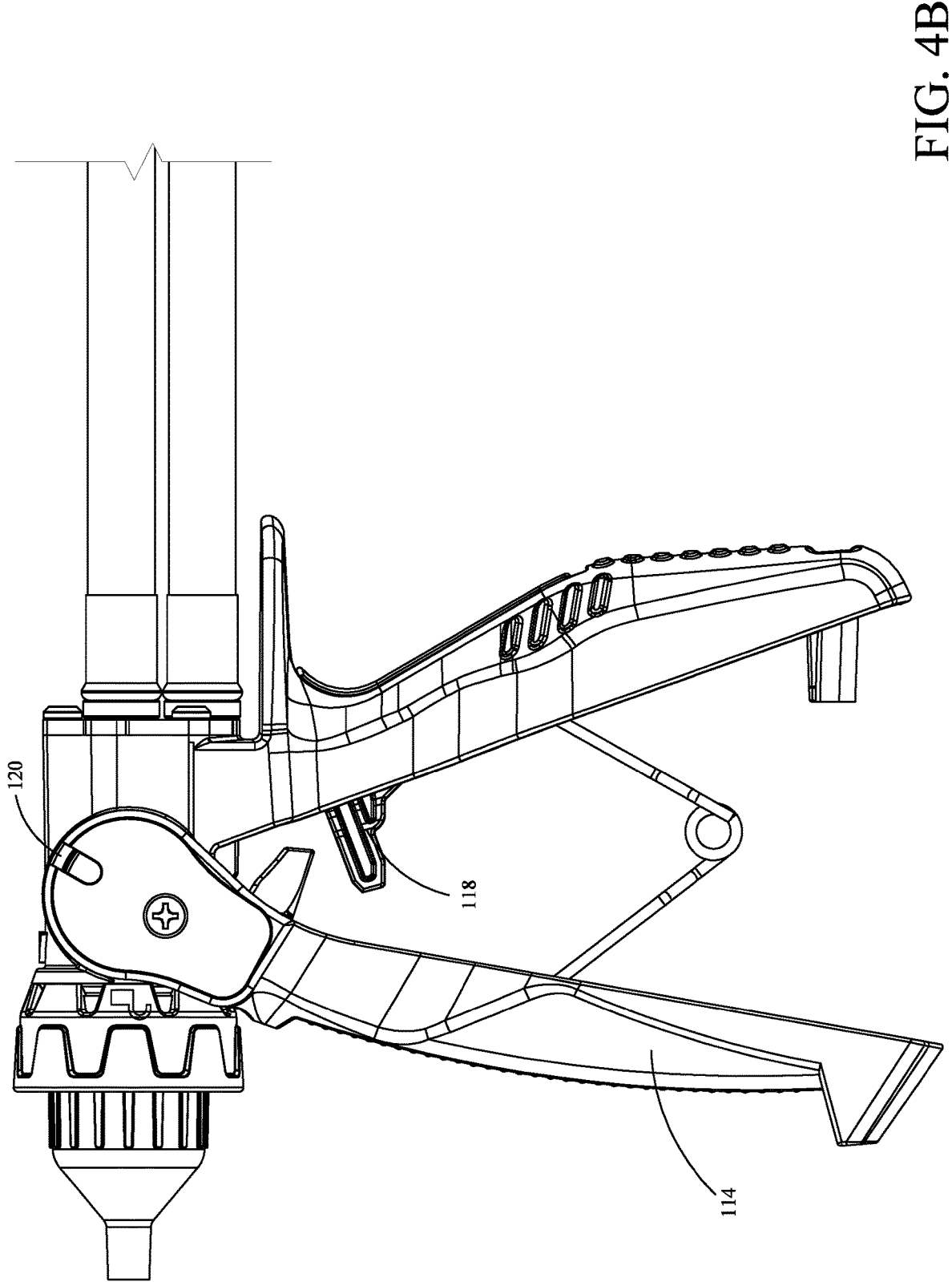
Figure 4C:
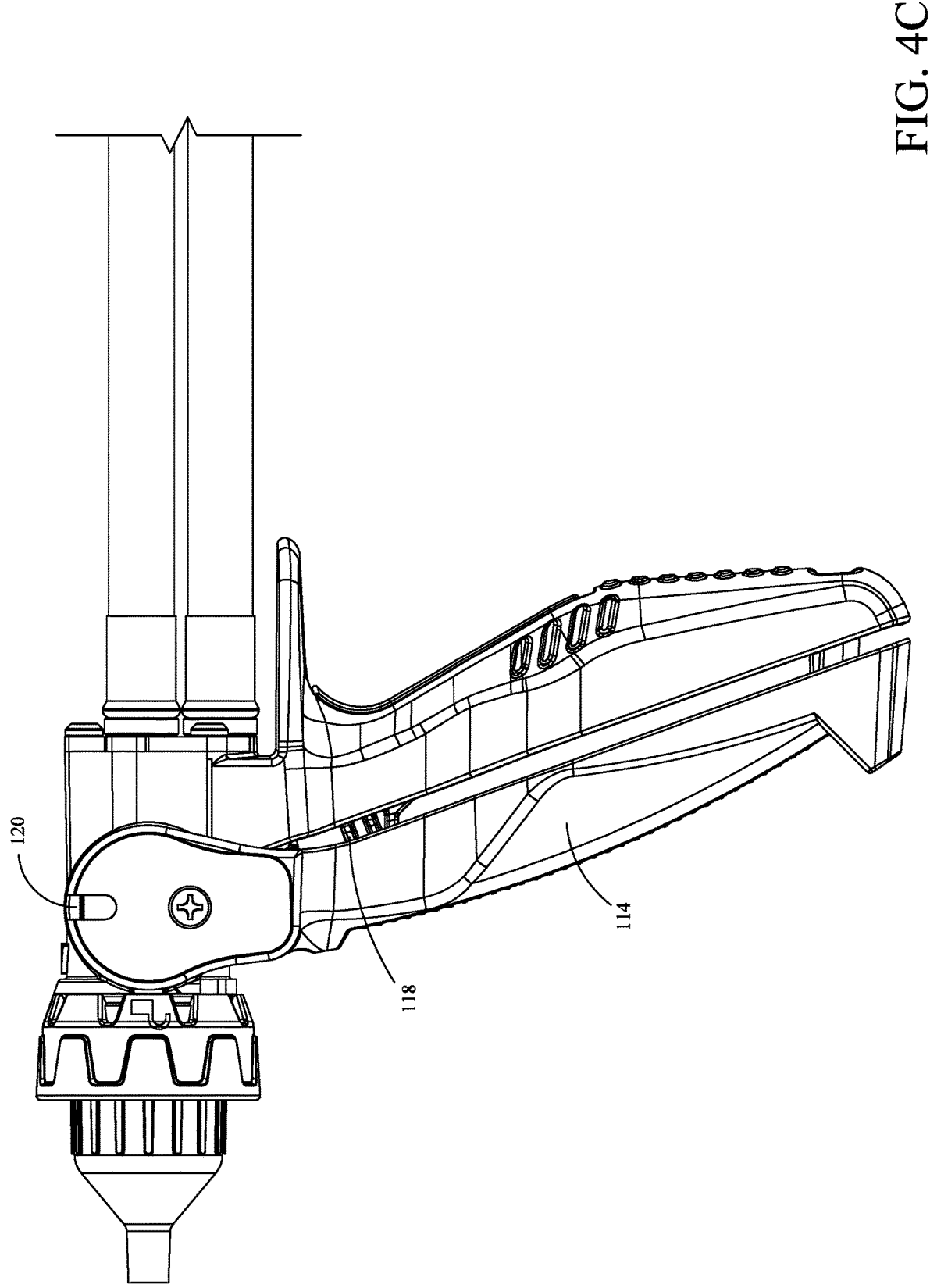

FIGS. 4A-C are side elevation views of plural component applicator 100 through various stages of actuation of trigger 114 and trigger lock 118. In FIG. 4A, trigger 114 is in an unactuated or closed position. In FIG. 4B, trigger lock 118 is in an actuated position. As shown, if trigger lock 118 is not in an actuated position, trigger 114 cannot be actuated. In some examples, trigger lock 118 is biased to an unactuated position (e.g., the one shown in FIG. 4A). In FIG. 4C, trigger 114 is in an actuated or open position, such that fluid is flowing through plural component applicator 100.

Figure 5A:
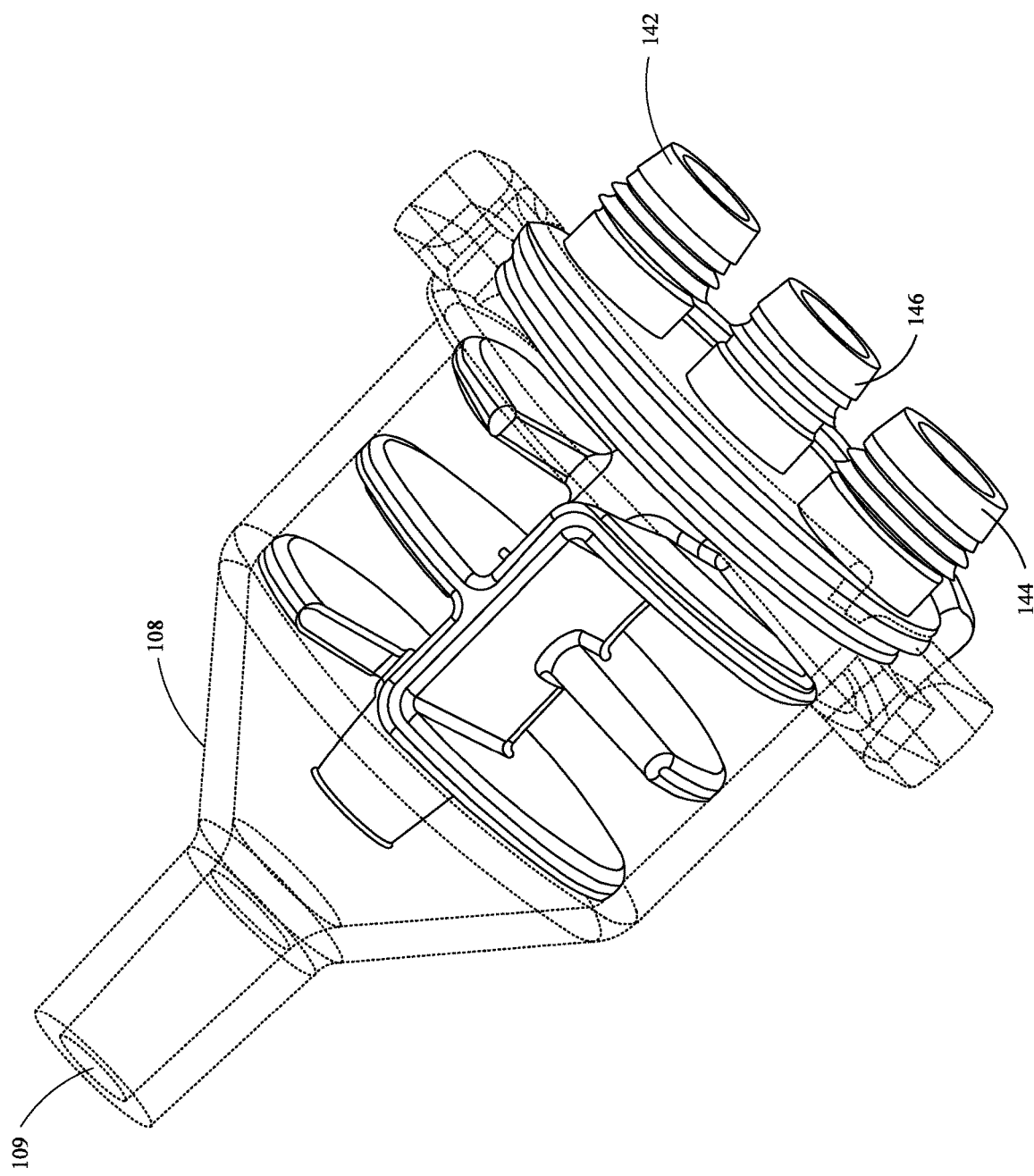
FIGS. 5A-5B are perspective views showing an example nozzle.

FIG. 5A is a perspective see-through view showing one example nozzle 108. As shown nozzle 108 includes an outlet 109, a nozzle component inlet 142, a nozzle component inlet 144 and an nozzle air inlet 146. Nozzle component inlet 142 interfaces with plural component applicator 100 to receive a first component (e.g., from valve 120). Nozzle component inlet 144 interfaces with plural component applicator 100 to receive a second component (e.g., from valve 120). The first and second components are mixed in nozzle 108 before being expelled through outlet 109. Plural component systems require often require the mixing of two or more components to generate a mixture to be applied on a surface. It is important in some applications that the components are very well mixed or there will not be a proper application of the final mixture.

Figure 5B:
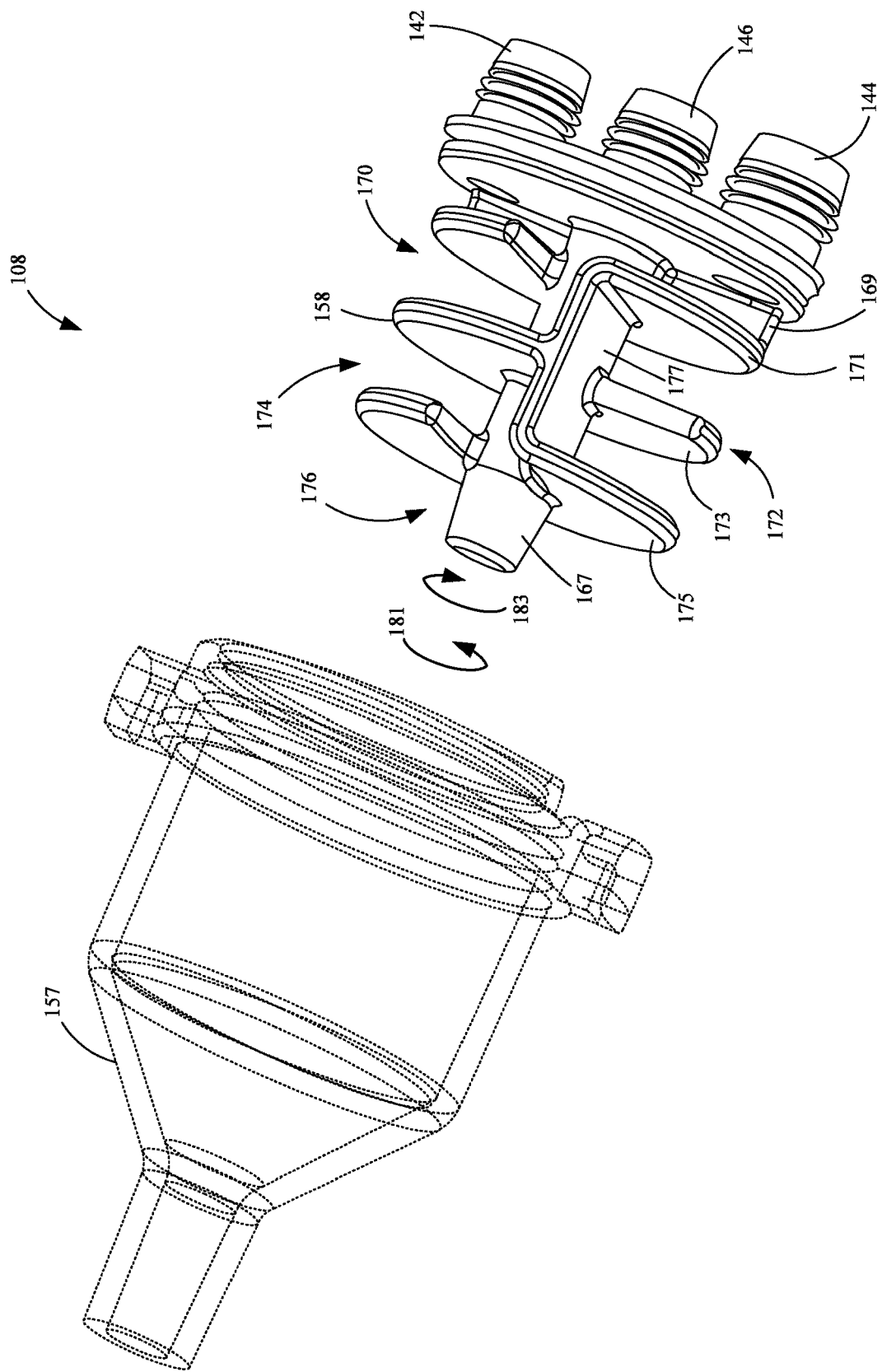

FIG. 5B is an exploded view showing one example nozzle 108. Nozzle 108 includes body 157 and maze 158. Tortuous structure 158 receives components from nozzle component inlet 142 and nozzle component inlet 144 and provide structure configured to mix these components before being expelled through outlet 109 of body 157. As shown, tortuous structure 158 seals against the inside of body 157 such that the components received must traverse a specific path around tortuous structure 158. Tortuous structure 158 is broken into first portion 170, second portion 172, third portion 174 and fourth portion 176. As shown fluid flowing in first portion 170 is rotated clockwise (indicated by arrow 181) due to the shape of walls 171 and 173. At second portion 172 the fluid flow is impeded by wall 177 and the rotational flow is reversed. At third portion 174 due to this reversal, fluid flows in a counterclockwise rotation (indicated by arrow 183) between walls 173 and 175. At fourth portion 176, the fluid is flowing towards outlet 109. The reversal of fluid flow in tortuous structure 158 is used to better mix the components received from nozzle component inlet 142 and nozzle component inlet 144. As shown, there are only four portions to tortuous structure 158, however, in other examples there may be additional portions defined by walls that reverse direction at flow of the components.

Additionally, when the fluids reach fourth portion 176 of tortuous structure 158 they encounter airflow being expelled out of air nozzle outlet 159. Air nozzle outlet 159 receives airflow from nozzle air inlet 146. This airflow from air nozzle outlet 159 can help atomize the mixed components as they are expelled from outlet 109. The airflow can also encourage more mixing of the components before their expelled through outlet 109.

Figure 5C:
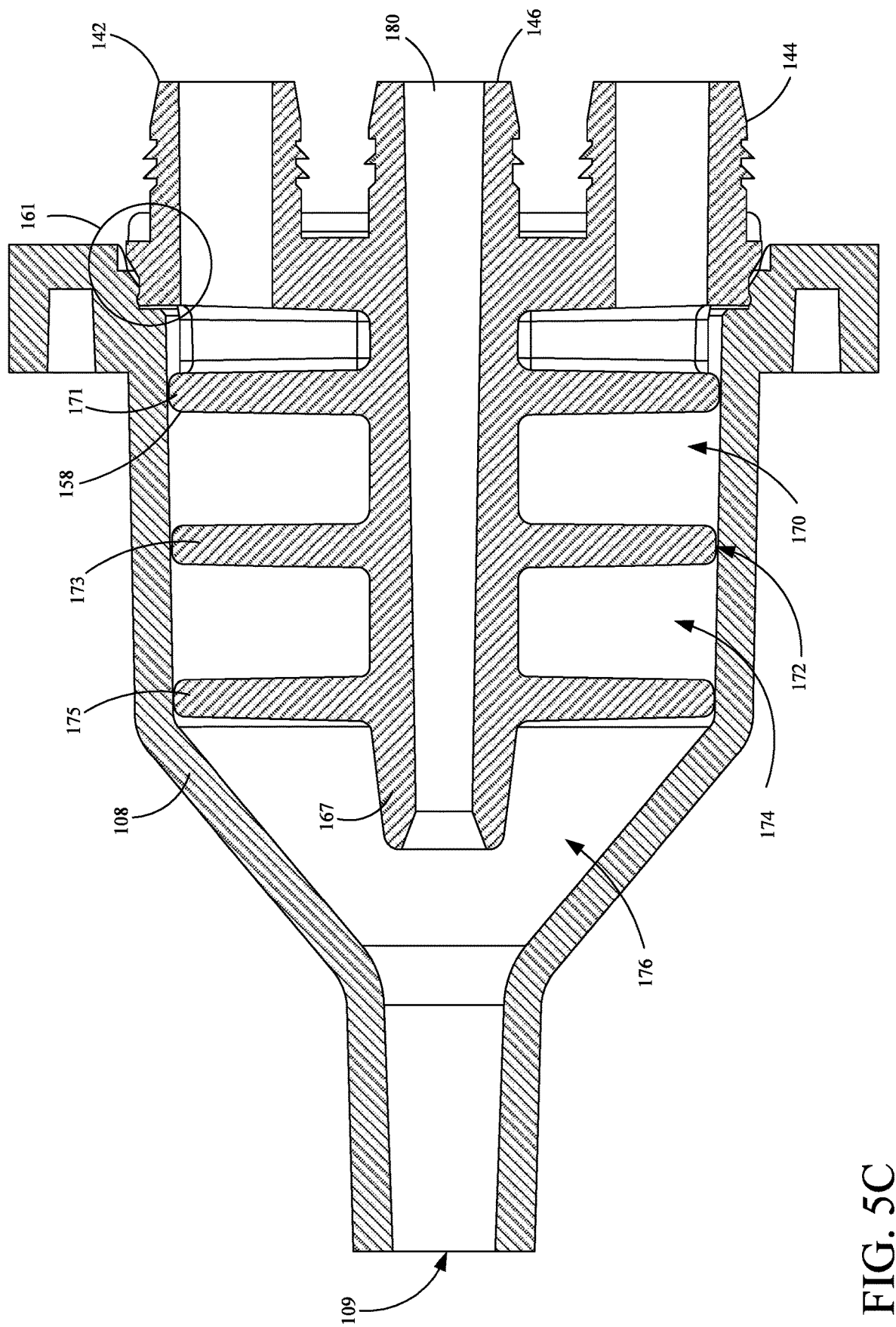
FIG. 5C is a sectional view of the example nozzle.

FIG. 5C is a sectional view showing one example of nozzle 108. Nozzle 108 includes body 157 and tortuous structure 158. Body 157 and tortuous structure 158 are coupled together at junction 161. Body 157 and tortuous structure 158 are coupled together through a snap design. However, in other examples body 157 and tortuous structure 158 can coupled together in other ways as well. As shown, tortuous structure 158 is snug within body 157 such that components being propelled through nozzle 108 follow the paths formed by walls 169, 171, 173, 175 and 177 of tortuous structure 158 and not in between tortuous structure 158 and body 157.

Tortuous structure 158 includes center post 167. Walls 169, 171, 173, 175 and 177 couple to, and are disposed around center post 167. As shown walls 171, 173 and 175 are perpendicular to the length of center post 167. However, in another example walls 171, 173 and 175 can be helical or spiral. Similarly, walls 169 and 177 can be oriented other than parallel to the length of center post 167.

Figure 5D:
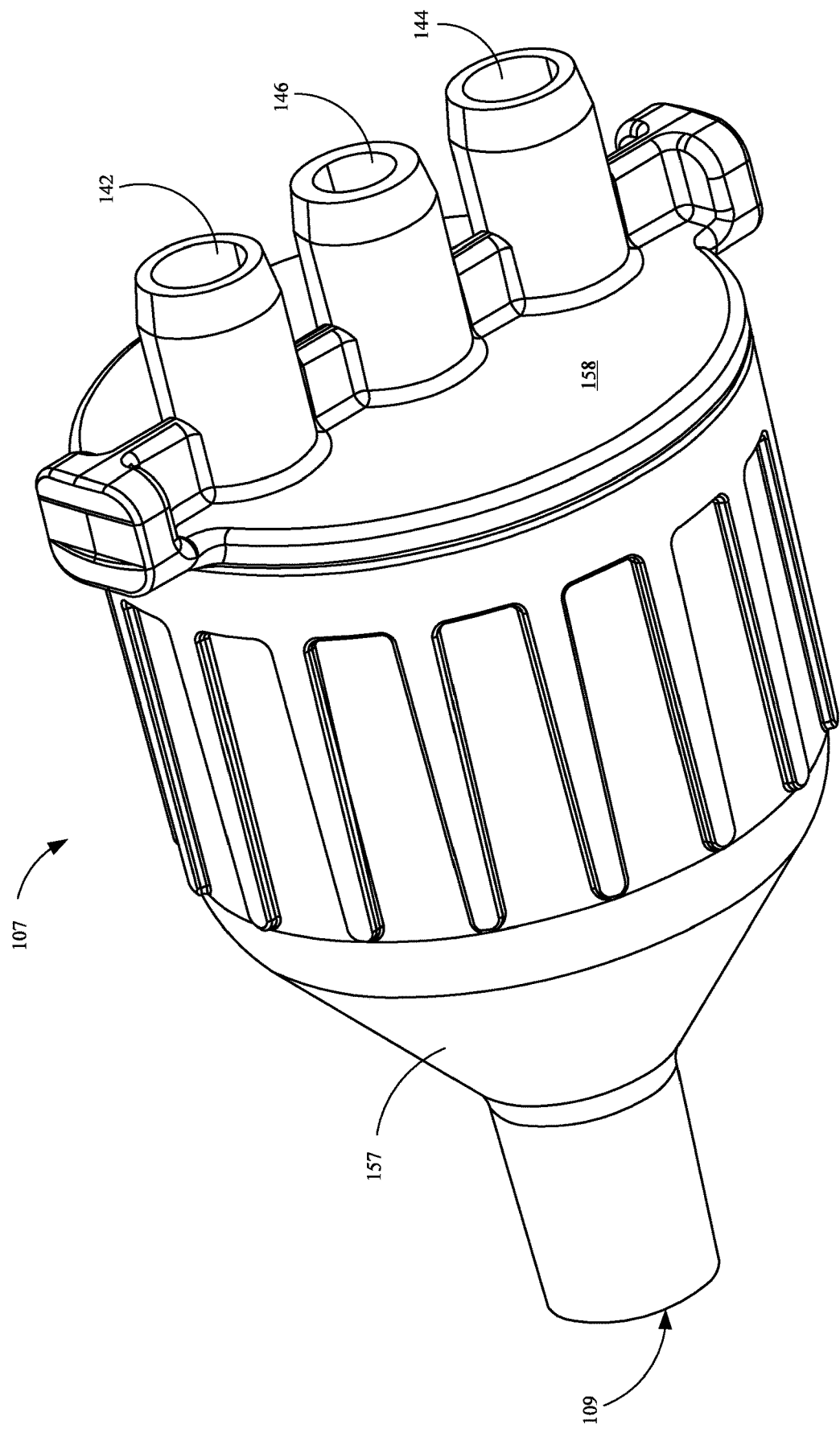
FIG. 5D is a perspective view showing an example nozzle.
Figure 5E:
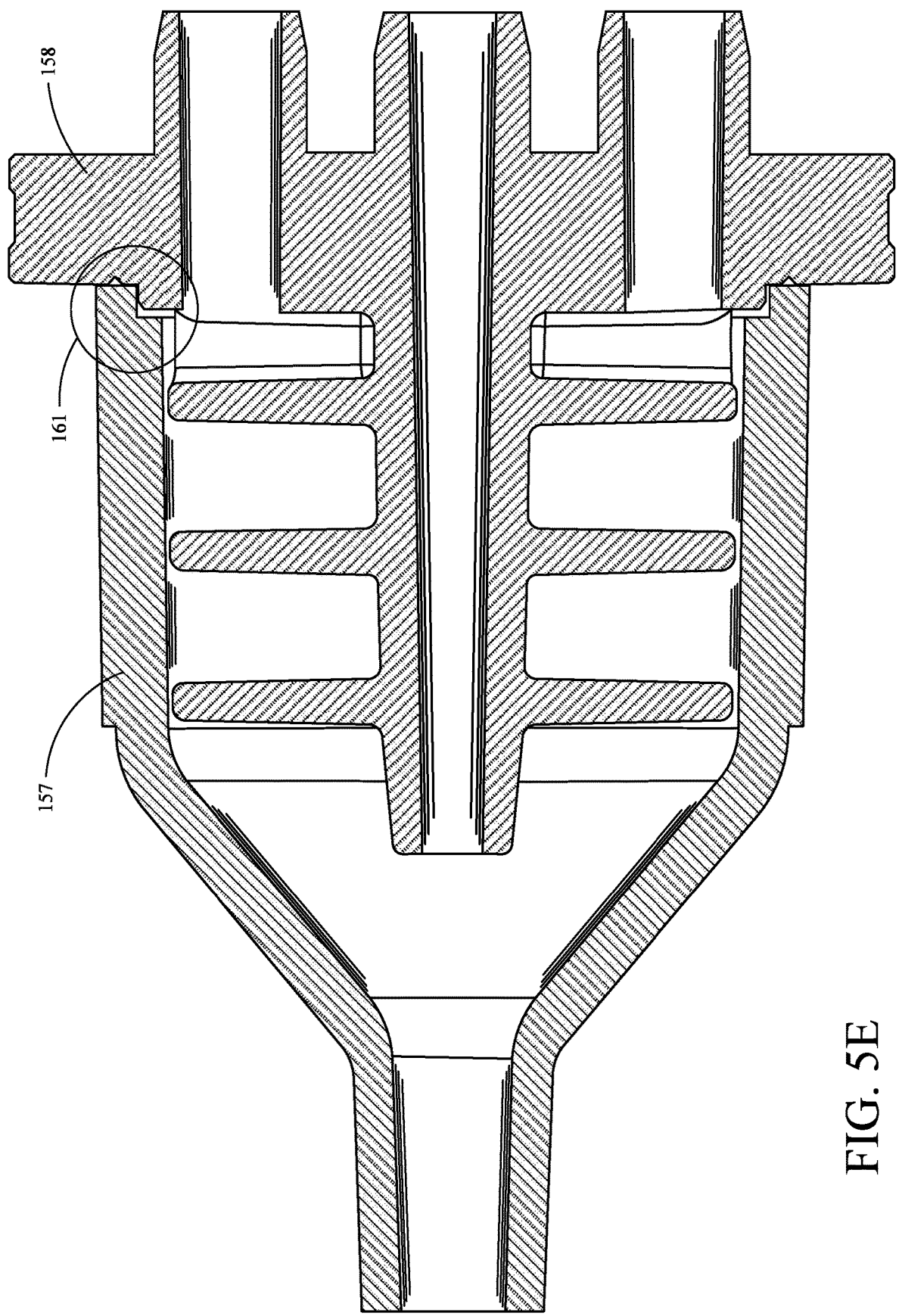
FIG. 5E is a sectional view of the example nozzle.

FIG. 5D is a perspective view showing one example nozzle 107. Nozzle 107 is similar to nozzle 108 in FIGS. 5 A-C and similar components are similarly numbered. One difference between nozzle 108 and 107 is that the nozzle component inlet 142, nozzle component inlet 144, air nozzle inlet 146 of nozzle 107 do not have crush barbs nor another sealing mechanism (e.g. O-ring channels, etc.). Instead, nozzle component inlet 142, nozzle component inlet 144 and air nozzle inlet 146 are sealed by face seals (e.g., O-rings, etc.) on the applicator. In other examples, however, a nozzle may be sealed in other ways as well.

FIG. 5B is a sectional view showing the example nozzle 107. Nozzle 107 is similar to nozzle 108 in FIGS. 5A-C and similar components are similarly numbered. One difference between nozzle 108 and nozzle 107 is how body 157 and tortuous structure 158 couple together. As shown, in FIG. 5E body 157 and tortuous structure 158 are ultrasonically welded together. However, in other examples body 157 and tortuous structure 158 can be coupled together in other ways as well.

Figure 6C:
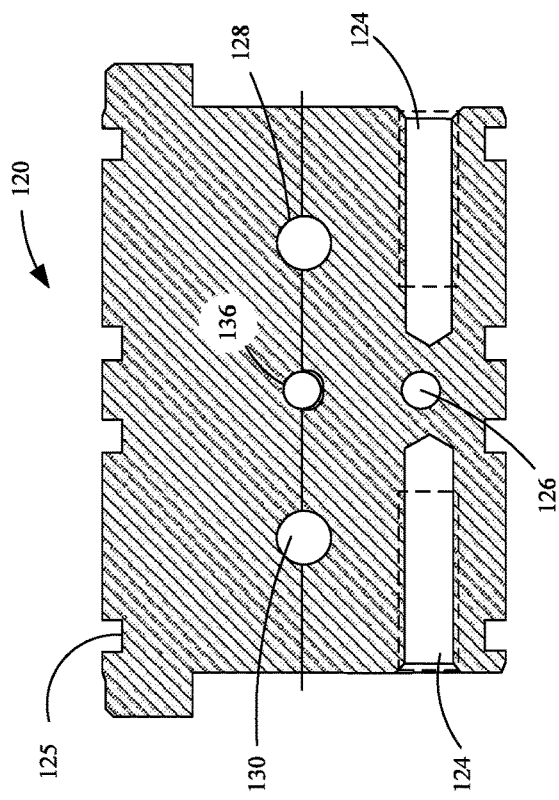
FIG. 6C is a sectional view of the example valve.
Figure 6B:
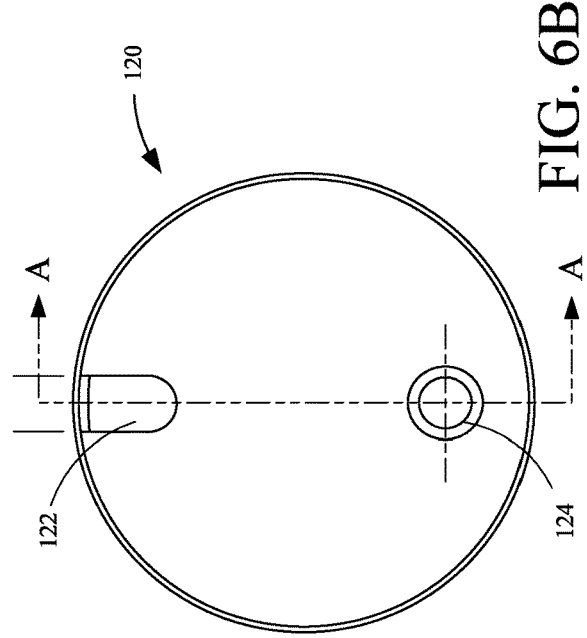
FIG. 6B is a side elevation view of the example valve.
Figure 6A:
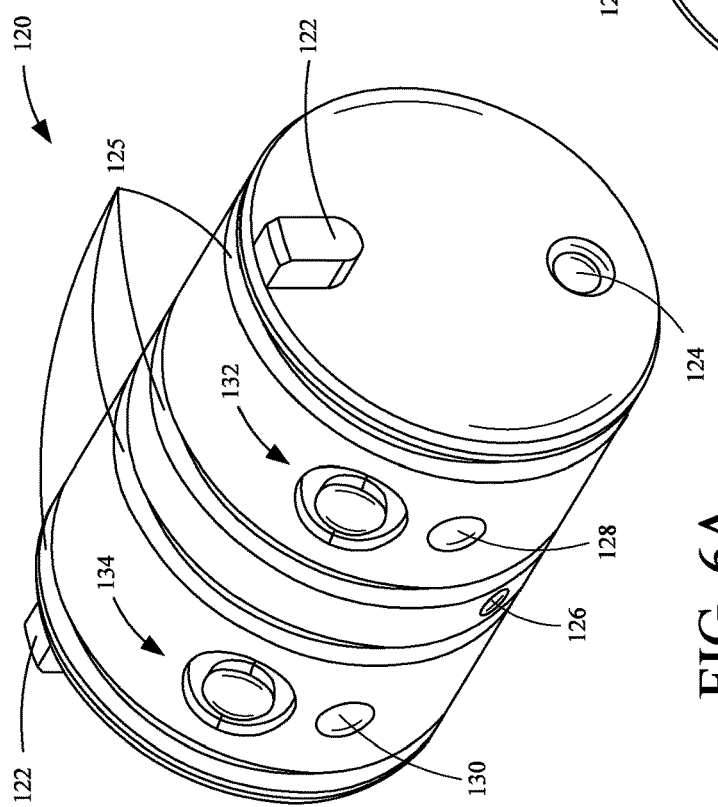
FIG. 6A is a perspective view showing an example valve.

FIGS. 6A-F are various views of valve 120. FIG. 6A is a perspective view of valve 120. Valve 120, as shown, can couple to an applicator (e.g., plural component applicator 100) by pin 122 and fastener adapter 124. Pin 121 can fit into a slot of a trigger, such as the trigger 114 in FIG. 1A. Fastener adapter 124 can receive a fastener such as valve fastener 113 in FIG. 1A. Because pin 122 and fastener after 124 are separated from one another, trigger 114 can provide a considerable rotational force on valve 120 (e.g., using a leverage advantage). Valve 120 rotates to expose different channels or plugs to inlets and outlets of applicator 100 as will be described below.

Component path 128, once installed, aligns with component supply line 102 of plural component applicator 100. Component path 130 aligns with component supply line 104 when valve 120 is in an opened position. As shown in FIG. 6C, component path 128 and component path 130 extend entirely through valve 120. When valve 120 is in a closed position component plug 132 aligns with component supply line 102. Component plug 132 can include an O-ring to better seal the end of component supply line 102. Component plug 132 seals the supply line and blocks a fluid flow from component supply line 102. Similarly, component plug 134 aligns with component supply line 104 when valve 120 is in a closed position. Channels 125 are located along the body of valve 120 and can receive a plurality of O-rings (or other seals) to prevent mixing of components before reaching a designated mixing area (e.g. in nozzle 108).

FIG. 6D shows a side elevation view of valve 120. As shown, there are two air paths; air path 126 and air path 136. Unlike component path 128 and component path 130, air paths 126 and 136 remain open regardless of the position of the valve (E.g. opened or closed). FIG. 6B is a sectional view of the cross-section defined by line B-B in FIG. 6D. FIG. 6B shows the destinations of air path 126 and air path 136. Regardless of whether valve 120 is in the open or closed position air flow enters either air path 126 or air path 136. However, the destination of the air changes dependent on the open or closed position. For example, when the gun is in an open position, airflow is directed towards nozzle atomization path 139 which leads directly to nozzle 108 to assist and atomization of the fluid being expelled from outlet 109. When the valve 120 is in the closed position, airflow from air path 126 is directed along nozzle purge path 138, which is more clearly shown in FIG. 6F.

FIG. 6F is a sectional view of the cross-section defined by C-C in FIG. 6E. When valve 120 is in an open position, component purge path 141 dead ends at a component of rotating valve housing 112 as does component purge path 140. However, airflow is still present in air path 136 and nozzle purge path 138. When valve 120 is in a closed position (i.e. such that components are not being delivered along component path 128 and component path 130), airflow is directed along component purge path 141 and component purge path 140. Airflow through component purge path 141 is directed into component nozzle interface 152 thereby purging this interface and flow path while the valve 120 is in a closed position. Airflow through component purge path 140 is directed to component nozzle interface 154 thereby purging the interface and path of the component. Airflow directed through nozzle purge path 138 can serve multiple purposes. When the valve is in a closed position, this air can purge nozzle 108 such that mix components in nozzle 108 do not harden. When valve 120 is in an open position, airflow through nozzle purge path 138/nozzle atomization path 139 help atomize the mixed components being expelled out of nozzle 108 through outlet 109.

Some previous plural component spray gun designs require a nozzle to snap into place within corresponding features of a spray gun. However, as noted previously, chemical buildup between the nozzle and the corresponding connection features on the spray gun can make connections difficult as the gun is used with more and more nozzles. This can eventually lead to a spray gun being unusable. Therefore, it is desired to have a nozzle connection mechanism that can still be easily coupled after repeated uses.

It should also be noted that the different embodiments described herein can be combined in different ways. That is, parts of one or more embodiments can be combined with parts of one or more other embodiments. All of this is contemplated herein. Additionally, at least some embodiments used at low pressure, e.g. under 250 psi.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A plural component applicator comprising:
   a first component inlet configured to receive a first component from a first delivery line;
   a second component inlet configured to receive a second component from a second delivery line;
   a nozzle comprising:
      a first component nozzle inlet;
      a second component nozzle inlet; and
      a nozzle outlet configured to expel a mixture of the first component and the second component; and
   a valve having:
      an opened position configured to:
         allow flow of the first component to the first component nozzle inlet,
         allow flow of the second component to the second component nozzle inlet, and
         restrict an air flow to the first component nozzle inlet; and
      a closed position configured to:
         restrict flow of the first component to the nozzle,
         restrict flow of the second component to the nozzle, and
         allow at least a portion of the air flow to the first component nozzle inlet in a downstream direction that is towards the nozzle outlet, and
   a trigger configured to rotate the valve between the opened position and the closed position.

2. The plural component applicator of claim 1, wherein the valve comprises:
   a first component plug configured to seal a first component valve inlet of the valve when the valve is in the closed position; and
   a second component plug configured to seal a second component valve inlet of the valve when the valve is in the closed position.

3. The plural component applicator of claim 1, wherein the valve comprises:
   a nozzle atomization path that directs a second portion of the air flow to the nozzle outlet when the valve is in the opened position and a third portion of the air flow to the nozzle outlet when the valve is in the closed position.

4. The plural component applicator of claim 3, wherein the valve comprises:
   a first air path inlet, the first air path inlet being configured to receive the air flow when the valve is in the closed position; and
   a second air path inlet fluidically coupled to the nozzle atomization path, the second air path inlet being configured to receive the air flow when the valve is in the opened position.

5. The plural component applicator of claim 1, wherein the valve comprises:
   a second component purge path configured to direct at least a second portion of the air flow to the second component nozzle inlet.

6. The plural component applicator of claim 1, wherein the nozzle comprises a maze configured to mix the first component and the second component in the nozzle.

7. The plural component applicator of claim 6, wherein the maze comprises:
   a first wall and a second wall, both the first wall and the second wall disposed about a center post, wherein the center post comprises:
      an air inlet configured to receive the air flow from the valve and an air outlet configured to direct at least a portion of the air flow to the nozzle outlet at a point downstream from the first wall and the second wall.

8. The plural component applicator of claim 7, wherein the nozzle comprises a two-part assembly comprising a first part and a second part, the first part comprising: a nozzle body, and the nozzle outlet; and the second part comprising: the maze, a first nozzle component inlet and a second nozzle component inlet.

9. The plural component applicator of claim 1, wherein the nozzle comprises:
   a first portion configured to direct flow of the first component and the second component in a rotational first direction; and
   a second portion disposed downstream from the first portion configured to direct flow of the first component and the second component in a rotational second direction opposite of the rotational first direction.

10. The plural component applicator of claim 1 further comprising:
    a handle; and
    a trigger lock coupled to a side of the handle opposite from the trigger, the trigger lock being configured to prevent actuation of the trigger.

11. The plural component applicator of claim 1, wherein the valve, when in the opened position, blocks the flow of air to the first component nozzle inlet.

12. The plural component applicator of claim 1, wherein the nozzle outlet is configured to expel the mixture of the first component and the second component along a first axis and wherein the trigger is configured to rotate the valve about a second axis transverse to the first axis.

13. The plural component applicator of claim 12, wherein the second axis is perpendicular to the first axis.

14. A plural component applicator comprising:
- a first component inlet configured to receive a first component from a first delivery line;
- a second component inlet configured to receive a second component from a second delivery line;
- a nozzle comprising:
  - a first component nozzle inlet;
  - a second component nozzle inlet; and
  - a nozzle outlet configured to expel a mixture of the first component and the second component;
- a valve comprising:
  - a first component channel;
  - a second component channel;
  - an air channel;
  - an opened position configured to:
    - place the first component channel in fluidic communication with the first component nozzle inlet to allow flow of the first component to the first component nozzle inlet through the first component channel;
    - place the second component channel in fluidic communication with the second component nozzle inlet to allow flow of the second component to the second component nozzle inlet through the second component channel; and
    - align the air channel with a first plug to restrict an air flow to the first component nozzle inlet; and
  - a closed position configured to:
    - align the first component channel with a second plug to restrict flow of the first component to the first component nozzle inlet;
    - align the second component channel with a third plug to restrict flow of the second component to the second component nozzle inlet; and
    - place the air channel in fluidic communication with both the first component nozzle inlet to allow at least a portion of the air flow to the first component nozzle inlet in a downstream direction that is towards the nozzle outlet and the second component nozzle inlet to allow at least a second portion of the air flow to the second component nozzle inlet in a downstream direction that is towards the nozzle outlet; and
- a trigger configured to rotate the valve between the opened position and the closed position.

* * * * *